United States Patent [19]

Bagley

[11] Patent Number: 4,654,147
[45] Date of Patent: Mar. 31, 1987

[54] AUTOMATED SYSTEM FOR CONTINUOUS MONITORING AND CONTROL OF THE AMOUNT OF DISSOLVED OXYGEN IN A PLURALITY OF MARINE LIFE FARMING POOLS OR SEWAGE TREATMENT INSTALLATIONS

[75] Inventor: William A. Bagley, Thomasville, Ala.

[73] Assignee: Automated Commercial Controls, Inc., Thomasville, Ala.

[21] Appl. No.: 840,076

[22] Filed: Mar. 17, 1986

[51] Int. Cl.[4] .............................................. C02F 1/74
[52] U.S. Cl. .................................... 210/744; 210/746; 210/747; 210/758; 210/85; 210/86; 210/96.1; 210/104; 210/134; 210/141; 210/143; 210/170; 119/3

[58] Field of Search ............... 210/739, 743, 744, 746, 210/747, 749, 758, 85, 86, 96.1, 102-104, 124, 134, 135, 141-143, 170, 200, 201, 219; 119/3

[56] References Cited

U.S. PATENT DOCUMENTS

| | | | |
|---|---|---|---|
| 3,524,547 | 8/1970 | Nicol | 210/134 |
| 3,679,053 | 7/1972 | Koulovatos et al. | 210/86 |
| 3,731,522 | 5/1973 | Mikesell | 210/96.1 X |
| 3,788,472 | 1/1974 | Boschen et al. | 210/103 |
| 4,224,154 | 9/1980 | Steininger | 210/143 X |
| 4,260,490 | 4/1981 | Moss et al. | 210/85 X |
| 4,268,383 | 5/1981 | Trobaugh | 210/103 |
| 4,308,150 | 12/1981 | Miyaoka et al. | 210/739 |
| 4,564,453 | 1/1986 | Coplot et al. | 210/96.1 X |
| 4,587,518 | 5/1986 | King | 210/85 X |

Primary Examiner—Tom Wyse
Attorney, Agent, or Firm—George J. Porter

[57] ABSTRACT

An automated control system for maintaining a supply of dissolved oxygen (DO) within a given range in each of a given plurality of pools for treating sewerage, farming fish, or the like, and energizing an alarm system (148 FIG. 1) which, when energized, will warn designated persons of the failure to maintain the amout of D.O. within the given range in a particular pool and with each pool comprising a first sensor for sensing the amount of D.O. in each pool, a settable indicator (146) for detecting, respectively, when the amount of D.O. drops below a first threshold and when the amount of D.O. drops below a second threshold, with both the first and second thresholds being selectively determinable by setting the indicator. Also provided is a communication link for transmitting the amount of D.O. to the indicators, a second sensor responsive to the amount of D.O. dropping below the first threshold (146) to energize the pool aerator (258 FIG. 3) to increase the amount of D.O. above the first level to a third level, a third sensor (146) responsive to the amount of D.O. reaching the third level to deactivate the second sensor, and a fourth sensor responsive to the amount of the D.O. decreasing below the second threshold to energize the alarm system (148) and warn the designated persons so that one or more of the designated persons can come to the automated control system (FIG. 2) and repair the cause of the amount of D.O. decreasing below the second threshold.

23 Claims, 11 Drawing Figures

NOTE:
GALVANIZED PIPE CLAMPS ARE BOLTED TOGETHER AT 90° WITH STAINLESS STEEL BOLTS AND WING NUTS.

AUTOMATED SYSTEM FOR CONTINUOUS MONITORING AND CONTROL OF THE AMOUNT OF DISSOLVED OXYGEN IN A PLURALITY OF MARINE LIFE FARMING POOLS OR SEWAGE TREATMENT INSTALLATIONS

I. BACKGROUND OF THE INVENTION

This invention relates generally to a system for monitoring and controlling the amount of dissolved oxygen (D.O.) in a pool or plurality of pools employed for treating sewerage or for farming marine life such as fish, or the like, and more particularly to an automated system for simultaneously and automatically maintaining the amount of D.O. individually in each of a plurality of such pools and to promptly and sequentially inform up to N predetermined people by a recorded telephone message transmitted by an automated telephone of the decrease of the amount of D.O. in any specific pool below a predetermined threshold until one of the callers answers his telephone and phones a predetermined code back to the automated telephone, followed up by a having a maintenance worker investigate and repair the ameliorate problem.

There are a number of working prior art devices for manually maintaining the desired amount of D.O. in a pool. Virtually all of these prior art systems employ some stirring type of device which, when activated, will increase the amount of D.O. in a pool. Such a stirring type device can be a submergible air pump, a paddle wheel, bank washers, root blowers or a hollow shaft pump, all in accordance with the National Fire Underwriters' Electrical code, although other devices are available. Some prior art devices also contain D.O. measuring probes which are immersed in the pool and measure the amount in suitable units, such as part per million (PPM), of D.O. in the pool and transmit signals to a meter which show the measured amounts of D.O.

However, there is no centrally located control which will automatically and continuously monitor the amount of D.O. in either a single pool or a plurality of pools. These prior art systems require periodic inspection by a human operator who must come to each pool and read the amount of D.O. which is being energized by the signals from the probe. If the amount of D.O. is too low the human operator must take the necessary steps to raise the amount of D.O. above the minimum allowed threshold, usually by activating the stirring or aerator device. If something more serious is involved then the human operator must take the necessary steps to repair the problem immediately or the fish in the pool will die, which can represent a financial loss running into several tens of thousands of dollars.

The foregoing systems have obvious, serious risks since a problem can develop in a given pool within five minutes after the last inspection and if the amount of D.O. in that pool drops fast enough and far enough all the fish in that pond will die before the next scheduled inspection occurs.

II. BRIEF SUMMARY OF THE INVENTION

In one preferred embodiment of the invention there is provided an automated control system for maintaining a supply of dissolved oxygen (DO) within a given range in each of a given plurality of pools for treating sewerage, farming fish, or the like, and energizing an alarm system which, when energized, will warn designated persons of the failure to maintain the amount of D.O. within the given range in a particular pool and with each pool system containing a sensor for sensing the amount of D.O. in each pool, and settable indicator means for detecting, respectively, when the amount of D.O. drops below a first threshold and when the amount of D.O. drops below a second threshold, with both the first and second thresholds being selectively determinable by setting the indicator means. Also provided is a communication link for transmitting the amount of D.O. to the first and second indicators, a first sensor responsive to the amount of D.O. dropping below the first threshold to energize the pool aerator to increase the amount of D.O. above the first level to a third level, a second sensor responsive to the amount of D.O. reaching the third level to deactivate the first sensor, and a third sensor responsive to the amount of the D.O. decreasing below the second threshold to energize the alarm system and warn the designated persons so that one or more of the designated persons can come to the automated control system and repair the cause of the amount of D.O. decreasing below the second threshold.

III. BRIEF DESCRIPTION OF THE DRAWINGS

IV. DETAILED DESCRIPTION OF THE INVENTION

A. General Description of the Operation

Figure 1:
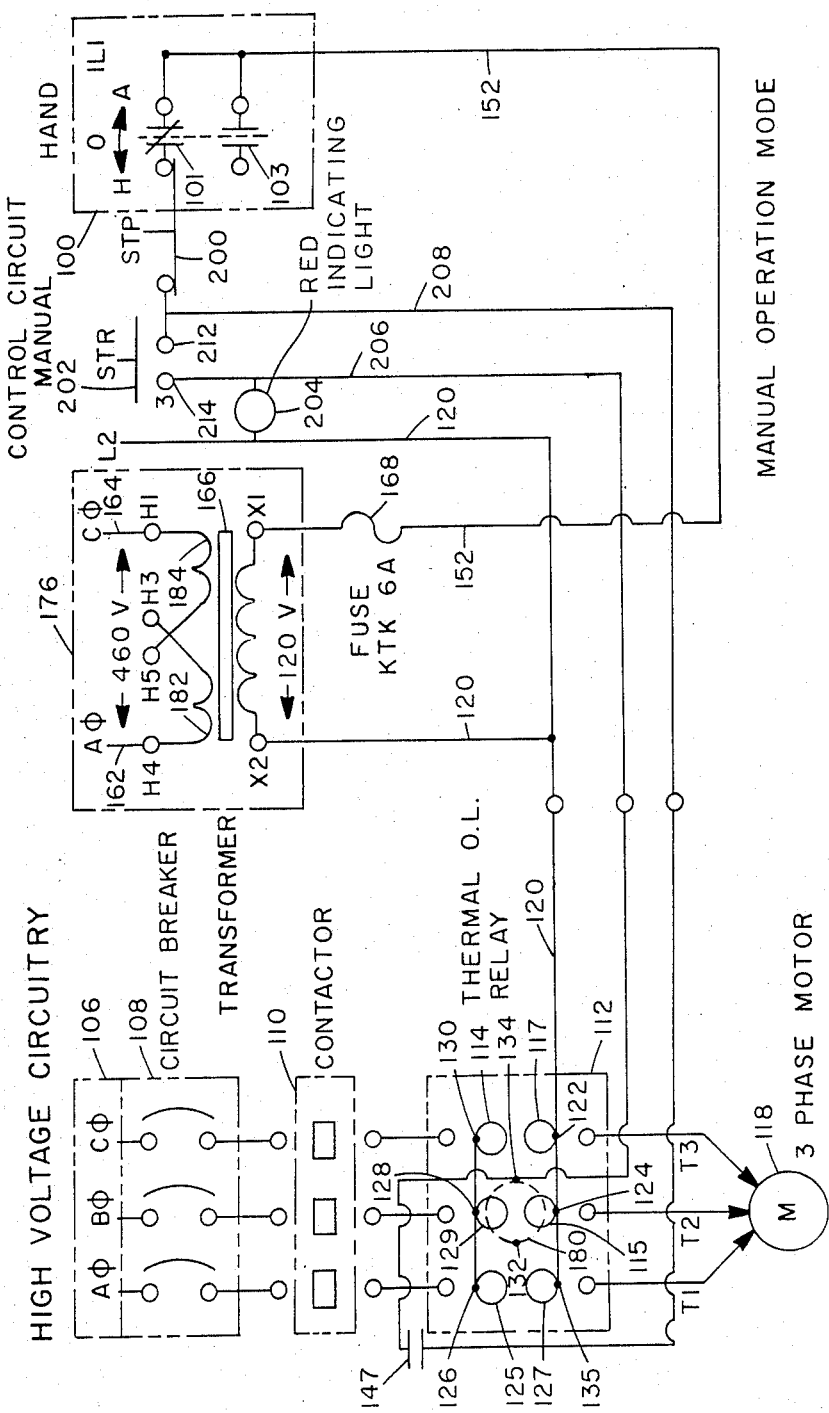
FIG. 1 shows a schematic diagram of the invention in the MANUAL mode of operation.

Before describing the individual figures, a brief general discussion of the invention will be set forth. The detailed description of the invention will be in accordance with the following outline of organization:

OUTLINE OF THE ORGANIZATION OF SPECIFICATION

I. BACKGROUND OF THE INVENTION
II. BRIEF SUMMARY OF THE INVENTION
III. BRIEF DESCRIPTION OF THE DRAWINGS
IV. DETAILED DESCRIPTION OF THE INVENTION
  A. General Description of the Operation
  B. Operation in the Manual Mode
  C. Operation in the Automatic Mode
V. DESCRIPTION OF THE OVERALL SYSTEM
VI. DESCRIPTION OF THE VARIOUS COMPONENTS OF THE INVENTION
  A. The Rexnord Dissolved Oxygen Analyzer
  B. The Alarm System Including the Automated Dialing Telephone
  C. The Kent Graph Recorder
  D. The 3 Phase 460 Volt Power Supply E. The Revolving Red Beacon Light
F. The Potter Broomfield Relay KRP 14 AN
G. The Main Pump
H. The Aerators The two main figures are FIG. 1 and FIG. 2 which respectively show the automatic and the hand or manual operation of the invention. These two figures cannot easily be combined since it would result in an unnecessarily complex circuit.

To switch to automatic operation the common selector switch 100 is switched to the automatic (A) position to close the contact 103, and to switch to the hand or manual operation mode the switch 100 is switched to the hand (H) position, thus closing contact 101.

The high voltage section is conventional and is common, with a few exceptions to be described later, to both the automatic and the manual modes of operation and include 3 phase 460 volts source 106, circuit breaker 108, contactor 110, and thermal overload relays (TOR) 112.

It should be mentioned at this point perhaps that it is the operation of the control circuits within TOR 112 that differ slightly in the automatic and manual modes of operation of the system.

Within the TOR 112 are six individual heaters such as heater 114, each of which resembles an imcomplete circle in FIG. 1. These heaters are spring loaded and surrounded by hardened solder. When overloaded with current the heaters, through which the motor 118 current passes, overheat and melt the solder, thereby releasing the spring loaded heaters in a manner as to interrupt the relay circuit 112, thereby shutting down the motor 118 which drives the aerator (shown on FIG. 3) and also shuts down main pump (shown in FIG. 3) which functions, by means of appropriate sensors, to maintain the amount of water in all four pools at the same level. The heaters can be reset when the solder cools and hardens.

The dotted circle 115 within the TOR 112 is the starter coil for the 460 volt 3 phase motor 118 and also operates to close the contacts of contactor 110 by energizing a solenoid (not specifically shown).

A 120 volt ac voltage is supplied from the X1 output of the secondary winding 167 of transformer 174 through 6 amp fuse 168, and lead 152 to one contact of relay contacts 101 and 103 and then through either relay contact 101 or 103 depending on whether the system is in the manual or the automatic mode of operation. Next, the 120 volts is supplied to contact 134 of starter coil 180 through different paths depending on whether the system is in the manual or the automatic mode, as will be discussed in detail in the discussion of FIGS. 1 and 2 which are set forth later herein.

Before an overload condition occurs the common lead 120 makes contact with each of the heater coils 122, 124, and 127, but not with heater coils 125, 129, and 114. After an overload occurs all the six heater coils 117, 115, 127, 125, 129, and 114 expand and coils 127, 115, and 117 make contact with heater coils 125, 115, and 114 so that all six heater coils are grounded to common line 120. Also, common lead 120 will be connected to contact 132 of 132 of starter coil 180 in case of an overload failure to deenergize starter coil 180 and thereby open contactor 16 to disconnect the motor 118 from the 3 phase 460 volt ac power source 106.

As an alternative to the solder type overload thermal relays, a bimetallic type contact can be employed which will break the circuit when the current flow becomes too large.

Figure 2:
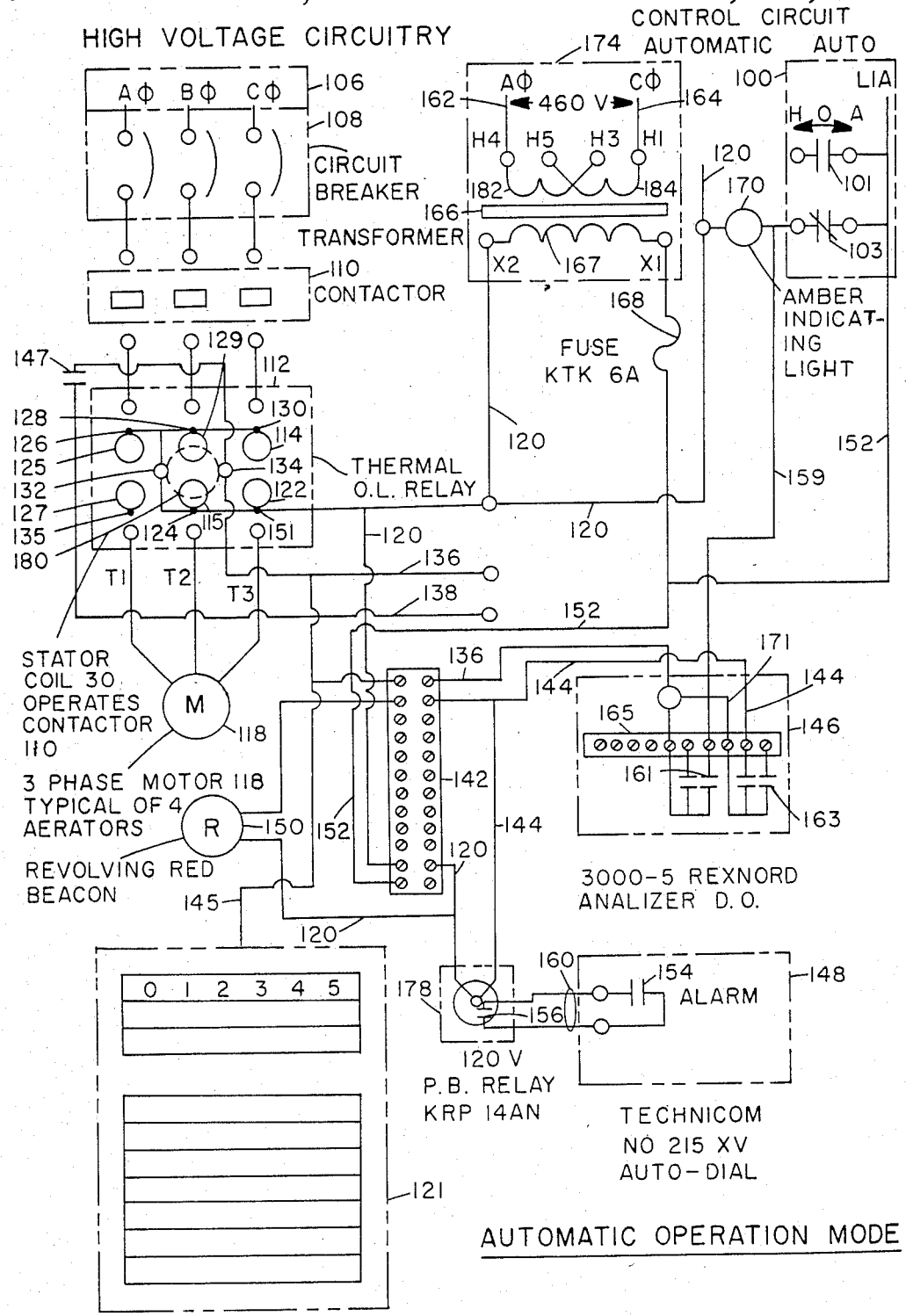
FIG. 2 shows a schematic diagram of the invention in the AUTOMATIC mode of operation.

Common lead 120 originates from the X terminal of secondary winding 167 of transformer 176 and also goes directly to one terminal of secondary winding 167 of transformer 176 and also goes directly to one terminal of both the red indicator light 204 of FIG. 1 and the amber indicator light 170 of FIG. 2.

In the automatic mode an ac voltage of 120 volts is required to supply operating power for D.O. analizer 146, alarm 148, Potter Broomfield (P.B.) relay 178 type KRP14AN, the revolving red beacon light 150, amber indicating light 170, and contacts 101 and 103.

In the manual mode, with relay contact 101 closed, the 110 volts is needed for the red indicator light 204 and the starter coil 180 through lead 206 directly to starter coil 180 contact 134. However, this cannot occur until manual starter switch 202 is closed upon contacts 292 and 214 at which time the locking circuit relay 147 is also energized. When switch 202 is released the 120 volts will continue to be supplied to starter coil 180 terminal 134 through lead 208 and closed locking contact 147.

In summary, the power supply source 174 consists of a primary winding comprised of windings 182 and 184 and with the end terminals thereof being connected to the A-O terminals and C-O terminals of the 460 volt ac source 106. A two terminal secondary winding 167 is coupled magnetically to the primary winding through a magnet 166. The two output terminals X and X of the 120 volt ac output of secondary winding 167 are connected respectively to the common lead 120 through 6 amp fuse 168 to lead 152 which is selectively connected to one contact of either contact 101 or contact 103 by means of the automatic/manual mode of operation switch 100.

IV. B. Operation In the Manual Mode

Up to this point the discussion has been directed generally to the common portions of both the automatic and the manual modes of operation. Consider now only the manual mode of operation shown in FIG. 1. In the manual mode of operation an operator will be present at the main console or control panel so it is not necessary to have D.O. analyzer 146, alarm 148, P.B. relay 178, revolving red beacon light 150, or the Kent analog graph recorder 121 connected into the system. The presence of the operator renders these elements unnecessary.

When in the manual mode of operation the manual control contact 100 connects the 110 ac volt source through relay contact 101 of normally closed (NC) stop switch 200 and then through either of two paths depending on whether normally open (NO) start switch 202 has been closed (depressed) to make a connection between its two contacts 212 and 214 or whethr it is open.

If start switch 202 is open then the circuit path of the 120 volts is through lead 208 and to normally open (NO) contact 147 and nothing will happen. The system will remain inoperative.

However, if start switch 202 is closed then the starter coil 180 of motor 118 will be energized by a 110 ac voltage which can be traced from output lead 152 of 120 volt source 176, relay switch 101, NC switch 200, closed relay switch start switch 202, and lead 206 which goes directly to terminal 134 of starter coil 180 to energize contactor 110 and supply the 3 phase 460 volts source to 75 H.P. motor 118.

Also, if start switch 202 is closed then the 110 volts will follow a path through common lead 120 to make contact in series with heater coils 151, 115, 127, 125, 129, and 114 by means of solder contacts 122, 124, 126, 128, and 130, respectively. It is to be noted that entire 120 volts appears across the red indicator light 204.

Since the motor 118 is running the pump (shown in FIG. 3) and the aerator (also shown in FIG. 3) are also operating.

It should be noted that the circuit breakers 108 will often open before the thermal relay 112 opens in the event of an overload or a short circuit to ground in the system. Both the circuit breakers 108 and the thermal overload relay 112 can be safely reset, but only by an experienced operator or electrician.

IV. C. Operation in the Automatic Mode

Consider now the automatic mode of operation when relay contact 103 of switch 100 is closed and relay 101 is open. The 120 ac voltage from terminal X of secondary winding 167 is supplied through 6 amp fuse 168, lead 152, closed relay contact 103 to one terminal of amber light 170 and also through lead 159, NC contact 161, lead 136, terminal strip 142, and lead 136 to terminal 134 of starter coil 180 to energize starter coil 180 and thereby close contactor 110 to supply the 3 phase 460 volt source 106 through circuit breakers 108, contactor 110, and thermal relay 112 to 75 H.P. motor 118 which will then function to operate the pool water levelling pump (shown in FIG. 3) and the individual aerator (also shown in FIG. 3).

The 120 volt source is also supplied from Rexnord D.O. analizer 146 to Kent graph recorder 121 via lead 136, terminal strip 142, and lead 145 which charts a continuous record of percentage of D.O. in each pool. As will be discussed in more detail later herein, the lead 145 is actually two leads and carries a signal which varies around 1.5 millivolts from Rexnord analyzer 146. The particular Kent made graph recorder employed in the present invention has six channels and consequently could chart the D.O. percentage in each of six pools. However, in the present embodiment of the invention there are only four pools so only four channels in the Kent graph recorder 121 are used, the remaining two channels charting straight horizontal lines across the graph paper.

The common lead 120 originating from output terminal X of secondary winding 167 of transformer 174 goes to the second terminal of amber indicator light 170 and also to contacts 122, 124, and 135 of thermal overload relay 112 in the same manner as in the manual mode of operation.

In the event the amount of D.O. does fall below such predetermined level the following events will occur.

The NC contact 161 in D.O. analyzer 146 and the NO contact in D.O. analyzer 146 will become, respectively, open and closed. It should be specifically noted that the relay contacts 161 and 163 act together as a pair of relay contacts so that when one is open the other will be closed.

When the NO contact 163 becomes closed the 120 volts on lead 159 will pass through lead 171 closed contact 163, lead 144 and then to two destinations. Lead 144 passes through terminal strip 142 to energize the revolving red beacon light 150 to indicate that the amount of D.O. in the pool has dropped below a predetermined level. Lead 144 also connects to a terminal of P.B. relay 178 to energize P.B. relay 178 and close NO contact 156 which in turn will cause NO contact 156 to close, thus energizing alarm 148, which is an automated telephone and which, when energized, will automatically and sequentially dial a predetermined number of predetermined telephone numbers and deliver a prerecorded message stating, in essence, that the amount of D.O. in a given pool has dropped below a predetermined level. Such sequential dialing of these predetermined telephone numbers will continue until one of the callees picks up his receiver and dials a predetermined code number back to the automated telephone 148 at which time the sequential dialing will cease. It is assumed that the callee who picked up his receiver wil take the necessary steps to have the .pa problem analyzed and repaired.

V. DESCRIPTION OF THE OVERALL SYSTEM

Figure 3:
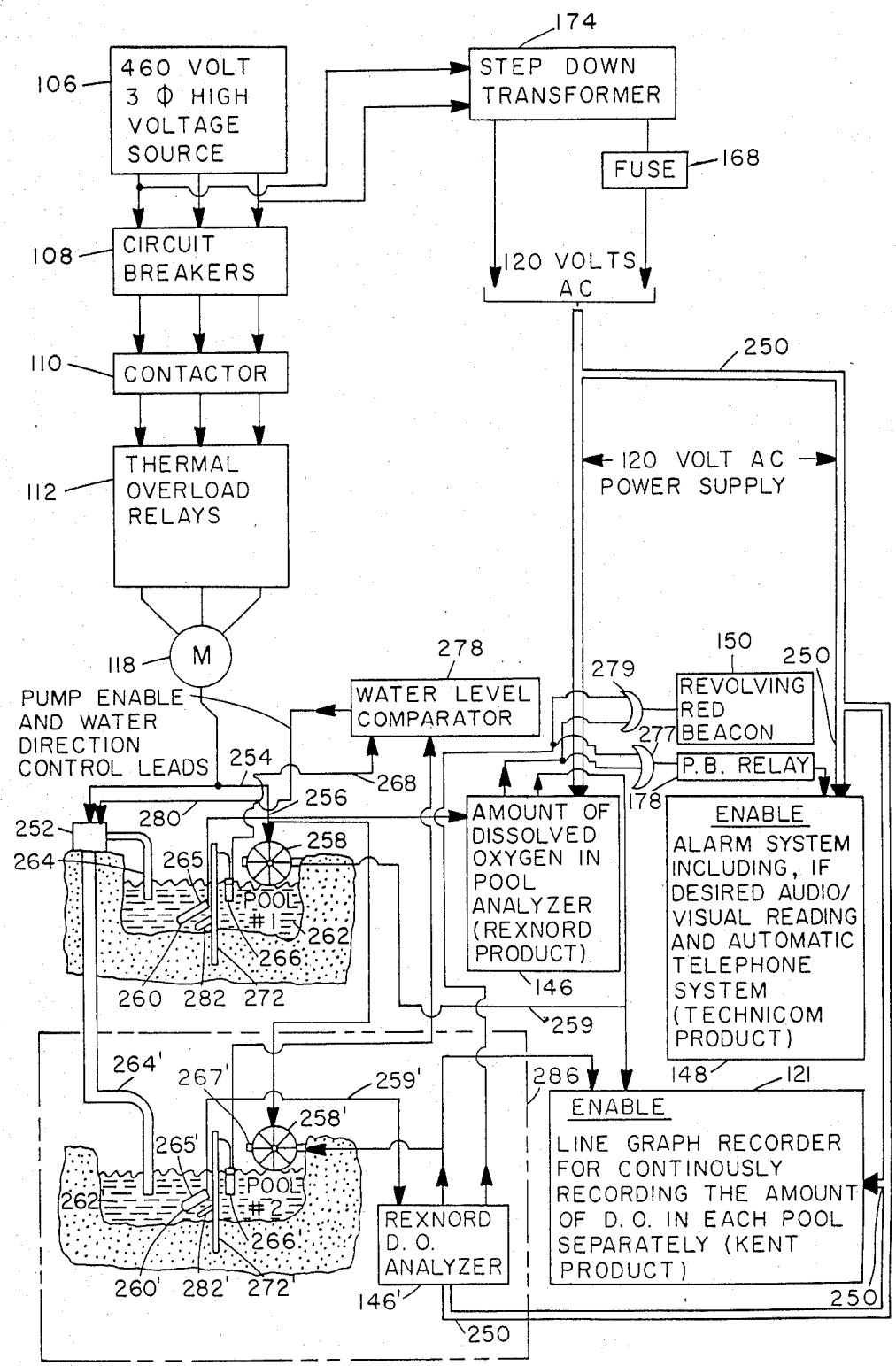
FIG. 3 is a block diagram of the overall invention.

Referring now to FIG. 3 there is shown a combination block diagram and structural schematic diagram of the overall system. Components of FIG. 3 which correspond to components of FIG. 2 are identified by the same reference character.

In FIG. 3 the 3 phase 460 volt source 106, the circuit breakers 108, the contactor 110, the thermal overload relay 112, the motor 118, the stepdown transformer 174, the 6 amp fuse 168, the D.O. analyzer 146, the P.B. relay 178, the revolving red beacon light 150, the alarm system 148, and the graph recorder 121 function as described in connection with the diagram of FIG. 2.

There are only two pools 262 and 262' shown in FIG. 3 although there are actually four separate pools in the system being described. All of the structure within block 286 is associated only with the second pool 262: The blocks 146, 178, and 148, as well as the probe 260, which is supported on arm 282 of upright shaft 272, by a clamp 265, water level indicator 266, hose 264, and paddle wheel aerator 258 which is supported on frame 267, are all a part of pool 262 (pool #1). The pump 252, the revolving red beacon 150, the water level comparator 278, and the line graph recorder 121 are .pa common to all of the pools.

The pump 252 draws water out of or injects water into each pool by means of hoses or pipes such as hose 264 under the collective direction of water level information sensed by water level sensors such as the water level sensors 266 and 266' in pools #1 and #2. Such information is supplied to water level comparator 278 which contains appropriate logic for comparing the water levels of all four pools and pumping water from one to another to keep the water levels in all pools substantially the same at all times. The water level comparator 278 transmits the necessary signals to common pump 252 via control signal carrying leads 280.

The pump 252 is mechanically connected to the output of motor 118 as are the aerators 258 and 258'. The aerators 258 and 258' are activated by the output from D.O. analyzers 146 and 146' when the amount of D.O. of pool #1 or pool #2 goes below a predetermined threshold.

When the amount of D.O. in any one of the pools drops below a second threshold which indicates the aerator is not putting enough oxygen into the pool, the D.O. analyzer sends a signal which activates the revolving red beacon light 150, and also P.B. relays 178, which in turn activates alarm system 148 (the automatic telephone dialing system).

Figure 4:
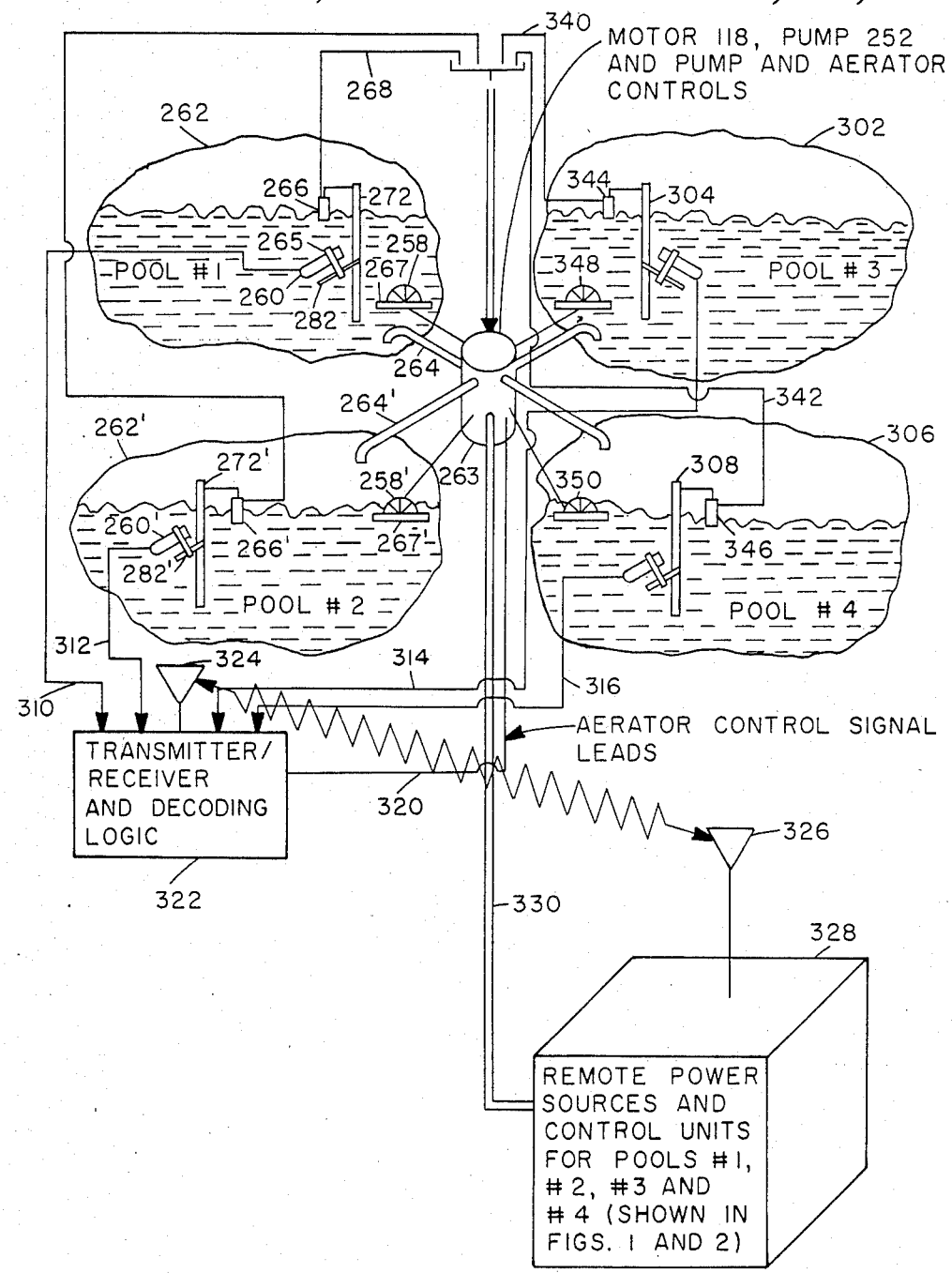
FIG. 4 is a broader block diagram of the overall invention.

Referring now to FIG. 4 there is shown another diagram of the overall system from a somewhat different point of view.

The four pools #1, #2, #3, and #4 all have the same equipment so only that of pool #1 will be described. Pool #1 has a probe 260 which is secured to arm 282 of vertical pole 272 by a bracket 265, a paddle wheel aerator 258, and a hose or pipe 264 leading to a common combination unit 263 containing the motor 118, the pump 252 (FIG. 3) and the controls for the pump, the motor, and the aerator. The pump 252 controls in unit 263 will, in response to signals from water level sensors 266, 266', 344, and 346, pump water from pool to pool, as required to maintain substantially equal levels in all four pools.

The transmission/receiver and decoding unit 322 will transmit and receive signals via antenna 324 to and from the main console control unit 328 (shown in FIGS. 1 and 2) via antenna 326. It is to be understood that the conventional radio frequency transmission system can be replaced by a cable between units 322 and 328, if desired. The cable 330 carries power to the motor 118 in unit 263 and also to the controls therein.

VI. DESCRIPTION OF THE VARIOUS COMPONENTS OF THE SYSTEM

A. The Rexnord Dissolved Oxygen Analyzer

The Rexnord Dissolved Oxygen (D.O.) analyzer 146 (FIG. 2) employed in the system is a Model 3000-5 with a Model 66 probe unit and is manufactured by the Rexnord Company, Electronic Products Division, located at 4301 Poche Court West, New Orleans, La., 70129.

There are seven independent functions and operations in this equipment.

(A) Manual Mode
(B) Automatic mode
(C) Alarm mode
(D) Analytical
(E) Aeration
(F) Pump
(G) Off Each system (one for each pool) is completely independent of another. The controller can be operated with all systems in the Automatic mode (AUTO) or with any sequence of the remainder in the manual (MANUAL) mode. Set the selector switch 100 to MANUAL, depress START switch 202 (FIG. 1) and the operator unit will energize. Depress the STOP switch 200 and unit will deenergize. In the MANUAL mode the analyzer power switch should be OFF. However, if in the ON position no harm will result to the equipment since the dissolved oxygen will still be monitored and alarm circuitry still functions. If left in the MANUAL position unit will not cycle on and off as in the AUTO position. This operation is intended to be used in case of malfunction in the AUTOMATIC MODE of operation. Aeration can be achieved as long as current is present.

In the AUTOMATIC MODE the unit will cycle the aerators ON and OFF maintaining a stable, constant supply of oxygen controlled by adjustable trip points in the 3000-5 analyzer. Differential cut-in and cut-out is present at the factory and has no bearing on desired D.O. setting. This differential is approximately three parts per million (PPM) D.O. Adjustable set points range is 0 to 15 PPM on the meter and 0 to 100% of the D.O. analyzer.

In the ALARM MODE the alarm set points are set one graduation below normal operating range on the D.O. analyzer. If the operating range is set at 5 on the meter and 20 on the analyzer, the ALARM will energize at 2.5 PPM. At this point the Technicom 215 XV automatic dialing system will energize and call up to twenty programmed telephone numbers and will continue to sequentially ring these numbers until someone acknowledges by dialing "A" or depresses the STOP operator located on the front of the console panel. Also a red revolving beacon light is mounted on the unit that operates as a physical means of notification of low D.O. and operates in conjunction with technicom 215 XV. The beacon light will continue to operate until the D.O. has reached a safe operating range.

In the analytical mode the REXNORD 3000-5 analyzer with the model 66 probe will perform the analytical portion of the controller. With the exception of service to the model 66 probe this system is virtually maintenance free. The 3000-5 analyzer produces the following information by use of a selector switch located on the front of the analyzer. Position 1 is AIR CAL, in this mode the probe is out of the water and calibration of the instrument is achieved whether the probe is to be serviced or not. Position 2 is ZERO. If the instrument is in calibration the meter pointer will point to 0 on the meter. Position 3 is TEMP. With the probe in the water the correct temperature (CENTIGRADE) will appear on the meter. Position 4 is HIGH TEMP. This is the scale used for dissolved oxygen read-out and controller operating range. The unit must be placed in the HIGH TEMP position and left in that position for unit to function. Position 5 is LOW TEMP and is not used in this application.

The aeration control portion depends on the type equipment the user has, such as paddle wheels, bank washers, submergible pump, root blowers, or hollow-shaft pump. The controller must be designed and equipped for a known horsepower and voltage in accordance with the NATIONAL FIRE UNDERWRITERS ELECTRICAL CODE.

The pump operation is separate and independent of any other and has the primary responsibility of maintaining the water level in all four pools at substantially the same level. In the MANUAL mode it can be energized at will. In the position OFF no functions will occur. In the AUTO mode the pump will operate continuously and will re-energize in the event of a power failure. Through the use of TIME DELAY RELAYS the pump will not re-energize until spinback of the pump motor has elapsed.

In the OFF position no system will function. Each selector switch must be in a mode of operation position, and all power switches in the ON position. The system is totally inoperative in the OFF position.

The KENT P616 recorder monitors up to six (6) channels and records dissolved oxygen content continuously. Channels 5 and 6 are not used in this application and will read 0 D.O. on the chart. Chart speed in one inch per hour per channel and chart life is approximately thirty-five days.

Figure 7:
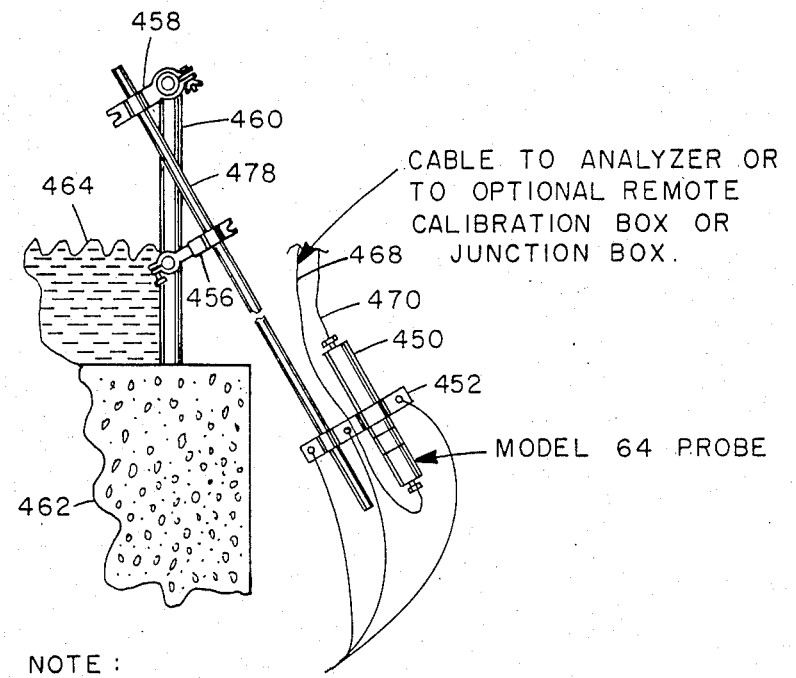
FIGS. 7 and 8 show more detailed diagrams of the probe.
Figure 8:
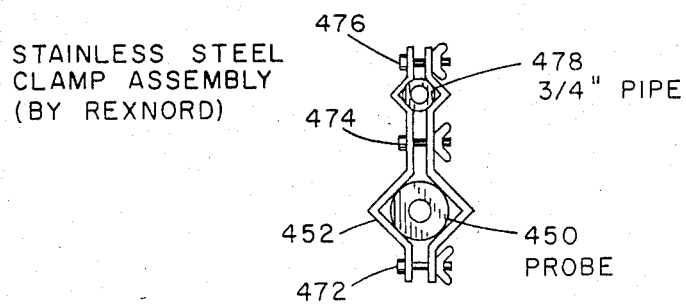

Referring now to FIGS. 7 and 8 there are shown an overall view of the probe and its supporting structure and the clamp that holds the probe to the supporting structure.

In FIG. 7 the probe 450 is secured to arm 478 by clamp 452. Arm 478 in turn is secured to upright pole 460 by clamps 456 and 458 and supported in its upright position by being embedded in concrete 462 at the bottom of the pool 464. The leads 468 and 470 carry the signal generated by probe 450 to the Rexnord D.O. analyzer 146 of FIG. 2.

In FIG. 8 the details of clamp 452 can be seen. More specifically, clamp 452 is secured to probe 450 by wing nuts 472 and 474 and to supporting arm 478 by wing nut 476.

For further information regarding the Rexnord D.O. analyzer reference is made to a publication entitled Model 3000-5 Dissolved Oxygen Analyzer Operation Manual, published by and obtainable from the Rexnord Company and incorporated herein and its entirety by reference.

VI. B. The Alarm System 148

The Alarm System 148 Including the Automated Dialing Telephone employed is a Technicom Model 215XV Automatic Dialing Telephone manufactured by the Technicom International, Inc. located at 23 Old Kings Highway S., Darien, Conn. 06820 and obtainable from South Central Bell, Advanced Systems, 3500 Blue Lake Drive, P.O. Box 229, Birmingham, Ala., 35243. Additional information regarding the Technicom Telephone Model 215XV is shown on pages 12 and 13 of a publication entitled "Automated Commercial Controls-Automatic Oxygen Analyzer" and of a publication published and obtainable from the Automated Commercial Controls Company located at Highway 43 South, P.O. Box 256, Thomasville, Ala., 36784 and incorporated in its entirety herein by reference. Further information relating to the Model 215XV Telephone can be obtained directly from the Technicom Co. or South Central Bell in Birmingham, Ala.

Figure 5:
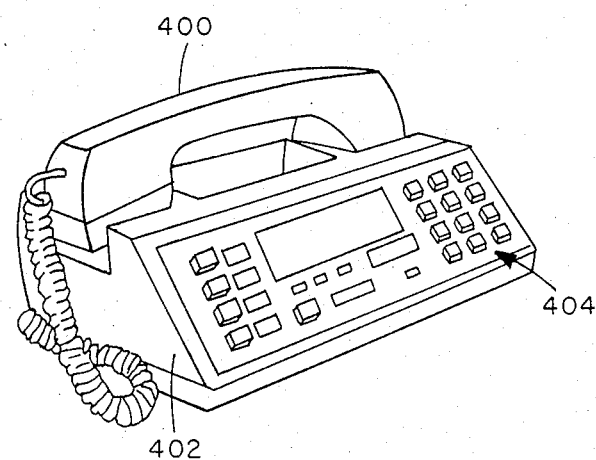
FIGS. 5 and 6 show more detailed diagrams of the automatic dialing telephone alarm system.
Figure 6:
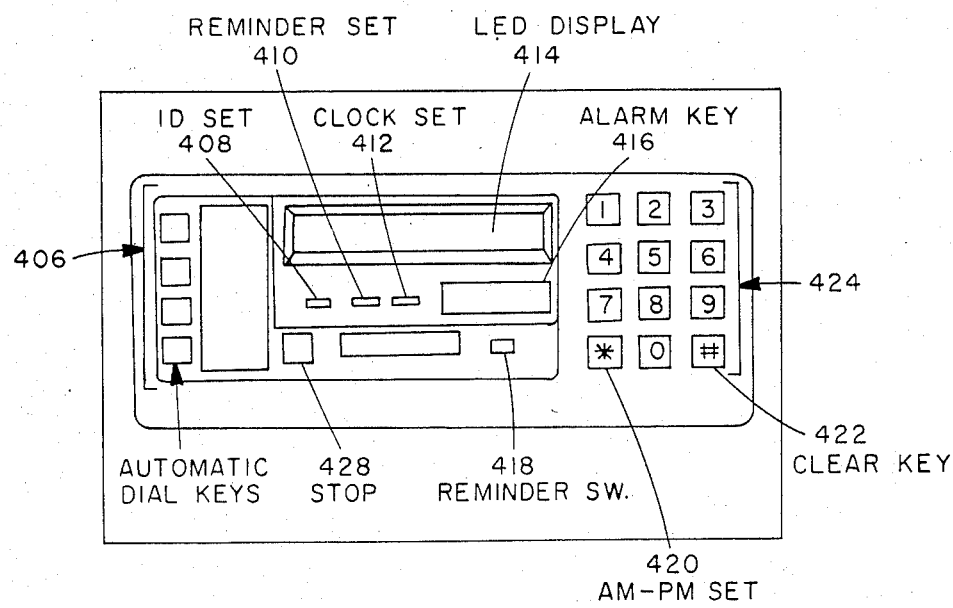

Referring now to FIGS. 5 and 6 there are shown, respectively, an isometric view and a front view of the automatic dialing telephone system. In FIG. 5 there is shown the usual hand receiver/transmitter 400, the base 402, and the control panel 404.

In FIG. 6 the control panel 404 is shown in more detail and includes four automatic dialing keys 406, and ID (Identification Number) set button 408, a reminder set button 410, a clock set button 412, an LED display 414, an alarm key 416, a keyboard 424, an AM-PM set button 420, a clear key 422, a reminder switch 418, and a stop button 428.

VI. C. The Model P 600 Kent Graph Recorder 121

The Model Kent Graph Recorder 121 employed in the system is manufactured by Kent Process Control, Inc. located at Raritan Center, Edison, N.J., 08837. Additional information thereon is shown on page 16 of the publication obtainable from the Automated Commercial controls Company mentioned above in paragraph VI C and incorporated herein by reference. Further information regarding the Kent Recorder can be obtained from Kent Process Control, Inc.

VI. D. The Heavy Duty 3 460 Volt Power Supply

The Heavy Duty 3 460 Volt Power Supply employed in the system can be obtained from the Heavy Duty Electric Co., a unit of General Signal of Goldsboro, N.C., 27530. Further information thereon is shown on pages 6 and 7 of the above mentioned publication obtainable from Automated Commercial Controls of Thomasville, Ala., and also from the Heavy Duty Electric Company.

VI. E. The Model #1215 Revolving Red Beacon Light 150

The Model #1215 Revolving Red Beacon Light 150 of the system is manufactured by the Federal Signal Corporation of Universal Park, Ill. Further information thereon can be obtained from the Federal Signal Corporation.

VI. F. The Potter Broomfield Relay 178

The Potter Broomfield Relay 178 is manufactured and sold by Potter Broomfield, Inc. located at Broomfield Ill. Further information regarding the relay can be obtained from the Potter Broomfield Company.

IV. G. The Main Pump 252

The Main Pump 252 (FIG. 3) is supplied by the user and can be any one of several types.

VI. H. The Aerators 258 (FIG. 3)

The Aerators 258 (FIG. 3) are supplied by the user and can be any one of several types.

Figure 9:
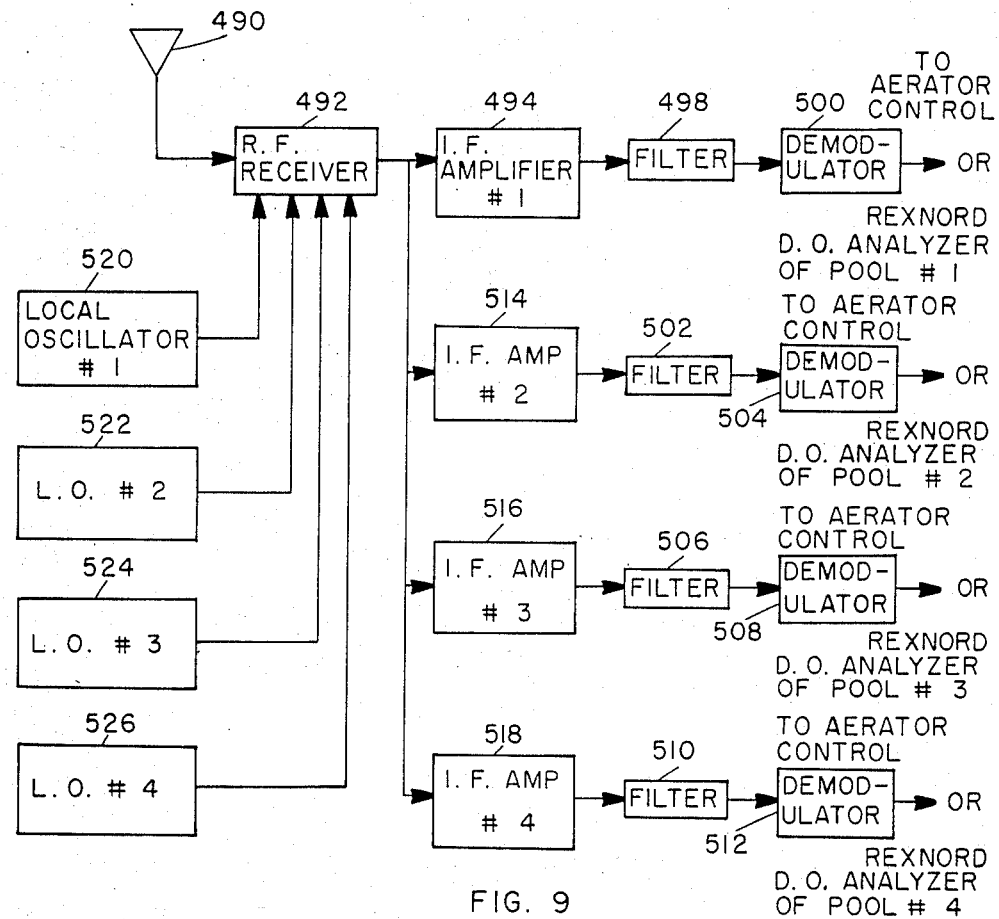
FIGS. 9 and 10 show more detailed block diagrams of a system for transmitting information between the probes and the D.O. analyzers.
Figure 10:
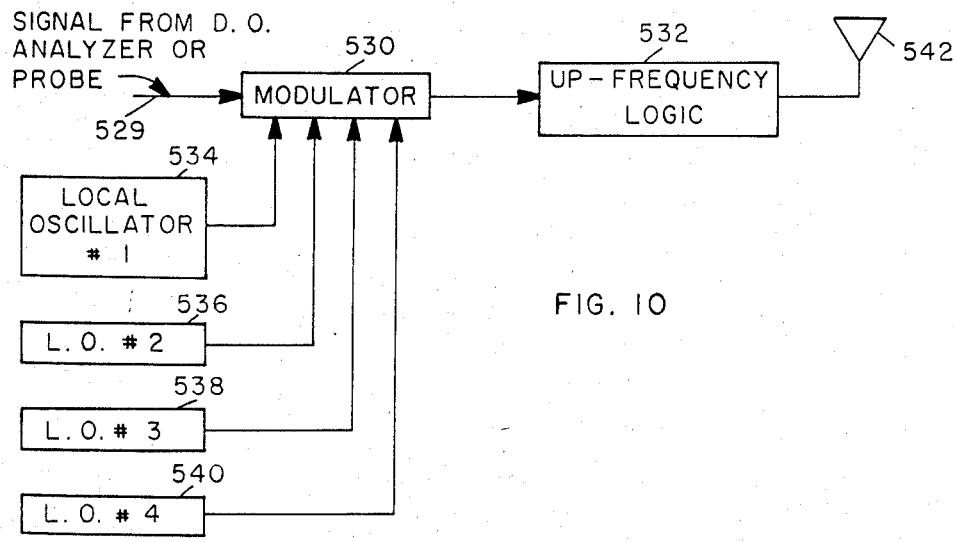

Referring now to FIGS. 9 and 10 there are shown block diagrams of a receiver and a transmitter for sending radio signals back and forth between the probes and the Rexnord D.O. analyzer for each pool.

In FIG. 9 the antenna 490 receives the transmitted signal from probe or D.O. analyzer and by means of R.F. receiver 492, local oscillators 520, 522, 524, and 526, IF amplifiers 494, 514, 516, and 518 four parallel arrangements of filters 498, 502, 506, and 510, and demodulators 500, 502, 508, and 512, extracts the analyzer command or the probe signal for each pool (using four different modulating frequencies).

In FIG. 10 the D.O. analyzer command or the probe signal is supplied to modulator 530 to which is supplied the four different frequencies of the local oscillators 534, 536, 538, and 540 of the four pools and the IF frequency outputs then stepped up to an RF carrier frequency in block 532 and transmitted via antenna 542.

Figure 11:
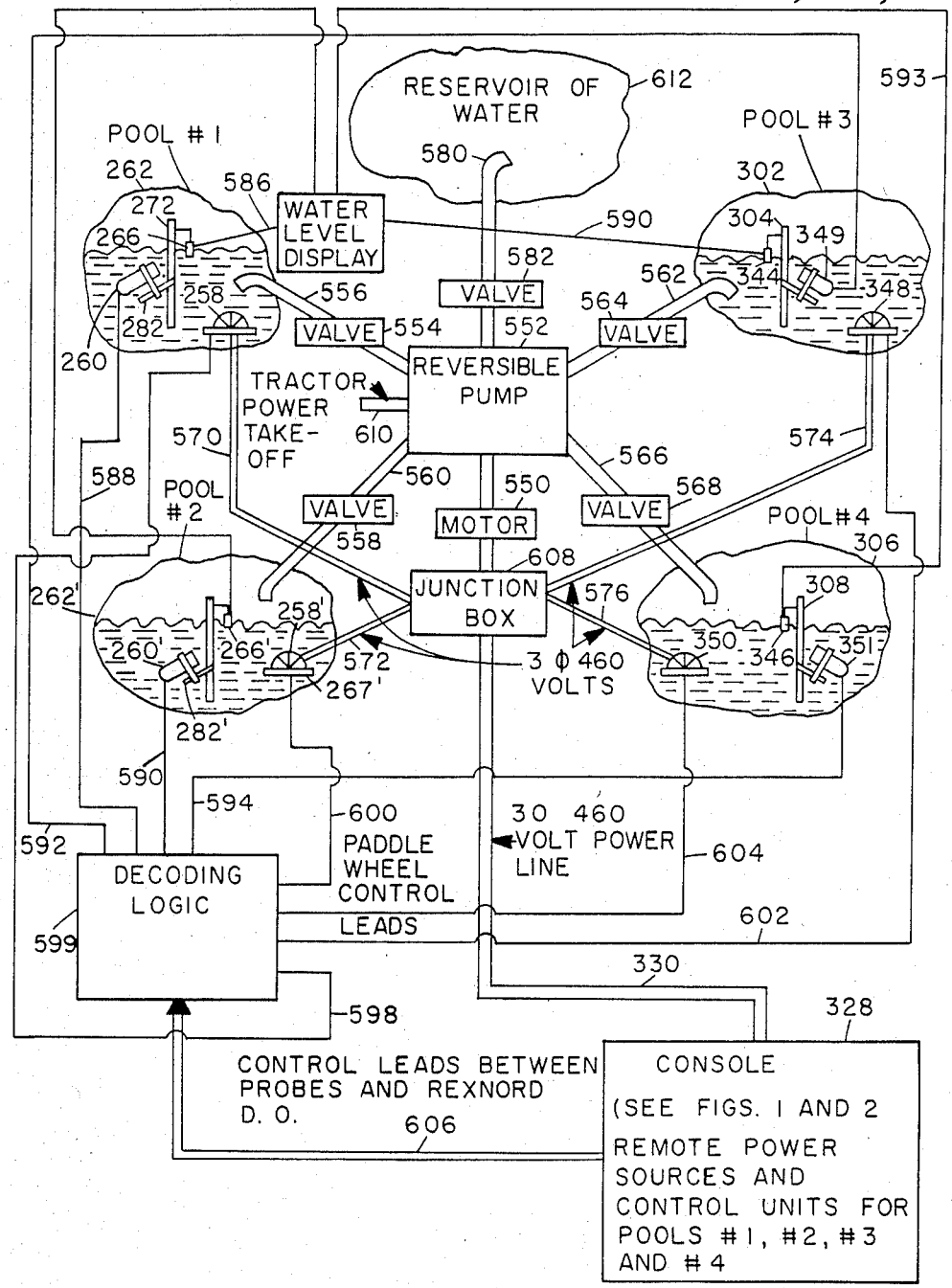
FIG. 11 shows an alternative overall system of operation.

Referring now to FIG. 11 there is shown an alternative overall arrangement of the invention which differs from that of FIG. 4 in several respects. These differences are set forth as follows.

The pump 552 which can be reversible or non-reversible, depending upon the user's choice and the motor 550 which drives pump 552 do not drive the four aerators 258, 258', 348, and 350 in FIG. 11 under control as they do in FIG. 4. The four aerators 258, 258', 348, and 350 of FIG. 11 receive power supplied from console 328 and through junction box 328, but still under control of the four Rexnord D.O. analyzers (one per pool) by means of signals or leads 598, 602, 604, and 600, which are derived from the four Rexnord D.O. analyzers in console 328 (also see FIG. 2), through cable 606, which carries signals back and forth between the four probes 260, 260', 349, and 351 of FIG. 11 via leads 588, 590, 592, and 593 decoding logic 599 and cable 606 to the four Rexnord D.O. analyzers of console 328, in lieu of the radio transmission system of FIG. 4.

As indicated above, in normal operation signals from the four probes 260, 260', 349, and 351 are supplied through leads 588, 590, 592, and 593 to logic 599 and then through cable 606 to the D.O. analyzers and console 328.

Also in normal operation the motor 550 drives the pump 552 which will pump water between any of the four pools or between any of the four pools and the reservoir 612, in either direction in all cases, depending on the setting of the five valves 582, 554, 558, 564, and 586, which will selectively open or close the water flow pipes 580, 556, 560, 562, and 566. It should be noted that all of the valves 582, 554, 558, 564, and 586 are manually operated so that a power failure will not effect their operation.

Furthermore, in the event of a power failure the reversible pump 552 can be operated by a tractor take-off shaft which can be coupled to the pump shaft 610. The water level indicator 266, 266', 344, and 346 can be read visually so that a power failure will not disable the reading thereof.

If desired the aerators 258, 258', 348, and 350 can also be operated manually by a tractor take-off arrangement which can include an extension of the shaft upon which the paddle wheel aerators revolve and a tractor take-off shaft which can be coupled thereto.

It is to be understood that water characteristics other than the D.O. can be monitored and changed in accordance with the application of the invention. For example, either in addition to the D.O. monitoring or in lieu thereof, the amount of chlorine or fluorine, the Ph, or almost any other characteristic of the water could be monitored simply by adding the proper detectors to the water, the proper analyzers at the main console, and the communication link between the detector and the corresponding analyzer. Any selected group of detectors or a single detector and the corresponding analyzer(s) could be used, depending on the application.

In each case the proper means must be provided for the increase or decrease of any chemical characteristic of the water, similar to the aerator's function of adding D.O. In the case of Ph level the water might be too acidic or too alkaline, calling for the addition of more alkaline or more acid. A device would be required analagous to the aerator for D.O. for adding acid or an alkaline compound.

Also, control means located at the pool, and a communication link from such control means back to the main console must be provided to respond to a signal generated by the Ph analyzer in the console to provide either acid or an alkaline compound back to the control means.

Similar structure is required for monitoring and correcting the amount of any other chemical in the water.

It is to be noted that the embodiments of the invention described and claimed herein are but preferred forms thereof and that one of ordinary skill in the art can design other embodiments which fall within the scope of claims and do not involve the exercise of additional invention.

I claim:

1. An automated control system for maintaining a supply of dissolved oxygen (DO) within a given range in each of a given plurality of pools for treating sewerage, farming fish, or the like, and energizing an alarm system which, when energized, will warn designated persons of the failure to maintain the amount of D.O. within said given range in a particular pool and with each pool comprising:
a sensor for sensing the amount of D.O. in each pool;
settable indicator means for detecting, respectively, when said amount of D.O. drops below a first level and when the amount of D.O. drops below a second level with both said first and second levels being selectively determinable by setting said indicator means;
first means for transmitting said amount of D.O. to said first and second indicators;
second means for responsive to said amount of D.O. dropping below said first level to become energized to increase said amount of D.O. above said first level to a third level;
third means responsive to said amount of D.O. reaching said third level to deactivate said second means;
an alarm system;
fourth means responsive to the amount of said D.O. decreasing below said second level to energize said alarm system and warn said designated persons so that one or more of said designated persons can come to said automated control system and repair the cause of the amount of D.O. decreasing below said second level.

2. An automated control system as in claim 1 in which said alarm system comprises an automated telephone preprogrammed to respond to energization thereof to dial consecutively up to N predetermined telephone numbers and delivering a message to each dialed telephone defining the location and identity of the pool whose amount of D.O. has dropped below said second threshold level, until a callee of one of said dialed telephone numbers responds by dialing a predetermined number or series of numbers on his called telephone, at which time said automated telephone will cease dialing any further numbers.

3. A system as in claim 1 and further comprising:
water level sensors positioned in a given plurality of pools to measure and generate a signal indicating the water level in each of said given plurality of pools; and
a control system responsive to each of said signals from each of said water level sensors of each of said given plurality of pools to determine the relative water levels in each of said given plurality of pools; and
a reservoir of water;
a water pump common to all of said given plurality of pools to pump water from one pool to another pool or between said reservoir and any given selected pool; and
water flow direction control valves responsive to the output signals from said control system to route the water pumped by said pump from one pool to another pool or from a reservoir to any selected pool to maintain a substantially equal water level in all of said pools of said given plurality of pools.

4. A system as in claim 3 and further comprising means for driving said pump with means other than a motor such as a tractor in the event of a power failure.

5. A system as in claim 3 in which said water level sensors comprise a printed scale thereon which can be read directly by visual means.

6. A system as in claim 1 in which said second means comprises:
agitating means for independently agitating the water in each pool of a given plurality of pools to increase the amount of dissolved oxygen (D.O.) in said each pool independently.

7. A system as in claim 1 and further comprising:
water level sensors positioned in a given plurality of pools to measure and generate signals indicating the water level in each of said given pools;
means responsive to said signals for displaying said water level in each of said given pools;

a plurality of pipes extending from said water pump to said reservoir of water and to each of said pools;

a hand operated valve in each of said pipes to control the flow of water selectively in any given pipe to maintain a desired and equal level of water in each of said given plurality of pools; and means for selectively agitating the water in each of said given pools when the amount of D.O. therein drops below predetermined levels.

8. An automated control system for maintaining a supply of dissolved oxygen (DO) within a given range in each of a given plurality of pools for treating sewerage, farming fish, or the like, and with each pool comprising:

first means for sensing the amount of D.O. in each pool;

second means for detecting, respectively, when said amount of D.O. drops below a first predeterminable level and when the amount of D.O. drops below a second predeterminable level;

third means for transmitting said amount of D.O. to said second means;

fourth means responsive to said amount of D.O. dropping below said first level to increase said amount of D.O. above said first level;

an alarm system;

fifth means responsive to the amount of said D.O. decreasing below said second level to energize said alarm system and warn designated persons so that one or more of said designated persons can come to said automated control system and repair the cause of the amount of D.O. decreasing below said second level.

9. An automated control system as in claim 8 in which said alarm system comprises an automated telephone preprogrammed to respond to energization thereof to dial consecutively up to N predetermined telephone numbers and delivering a message to each dialed telephone defining the location and identity of the pool whose amount of D.O. has dropped below said second level level, until a callee of one of said dialed numbers responds by dailing a predetermined number or series of numbers on his called telephone, at which time said automated telephone will cease dialing any further numbers.

10. A system as in claim 8 and further comprising:

water level sensors positioned in a given plurality of pools to measure and generate a signal indicating the water level in each of said given plurality of pools; and a control system responsive to each of said signals from each of said water level sensors of each of said given plurality of pools to determine the relative water levels in each of said given plurality of pools; and a reservoir of water;

a water pump common to all of said given plurality of pools to pump water from one pool to another pool and between said reservoir to one or more selectable pools;

water flow direction control valves responsive to the output signals from said control system to route the water pumped by said pump from one pool to another pool or from said common reservoir to any selected pool to maintain a substantially equal water level in all of said pools of said given plurality of pools.

11. A system as in claim 8 in which said fourth means comprises:

agitating means for independently agitating the water in each pool of said given plurality of pools to independently increase the amount of dissolved oxygen (D.O.) in said each pool.

12. A system as in claim 8 and further comprising:

water level sensors positioned in said given plurality of pools to measure and generate an electric signal indicating the water level in said given pools;

means for displaying said water level in each of said given pools;

a water pump;

a reservoir of water;

a plurality of pipes extending from said water pump to said reservoir of water and to each of said pools;

a hand operated valve in each of said pipes to close control the flow of water selectively in any given pipe to maintain a desired and equal level of water in each of said given plurality of pools; and means for selectively agitating the water in each of said given pools when the amount of D.O. therein drops below predetermined levels.

13. A system as in claim 12 and further comprising means for driving said pump with means other than a motor such as a tractor in the event of a power failure.

14. A system as in claim 12 in which said water level sensors comprise a printed scale thereon which can be read direcly by visual means.

15. A method for automatically maintaining the dissolved oxygen (D.O.) in each of a plurality of pools employed for sewerage treatment, fish farming, or the like, and with each pool having aerating means for increasing the amount of D.O. in a given pool, when energized, and comprising the steps of:

sensing the amount of D.O. in each pool individually;

transmitting said sensed amount of D.O. to a centrally located D.O. amount indicator means adjustable to indicate a plurality of thresholds of D.O. in said given pool;

setting said indicator means to indicate D.O. amounts at first, second, and third thresholds, with the amounts of D.O. at the levels increasing in the order of listing of said three levels and with the amount of D.O. in said first level being the lowest of the three levels;

continuing operation of said given pool with no man-induced change in the amount of D.O. therein when said amount of D.O. lies at or above said second level;

energizing said aerating means in said given pool to increase the amount of D.O. in said given pool when the amount of D.O. falls below said second level;

energizing an alarm system when the amount of D.O. in said given pool falls below said first level to warn predetermined personnel that a problem requiring human assistance is present;

de-energizing said alarm system when said amount of D.O. in said given pool rises above said second level; and de-energizing said aerating means when said amount of D.O. in said given pool rises above said third level.

16. A method as in claim 15 in which the step of energizing said alarm system further comprises the steps of:

providing an automated telephone capable of sequentially dialing a series of telephone numbers of N predetermined personnel and delivering a recorded message stating that a particular pool has developed a problem requiring human assistance and any other information which is deemed desirable and ceasing to dial any further telephone numbers when one of the callees answers his telephone and dials a predetermined code back to the automated telephone.

17. A method for automatically maintaining the dissolved oxygen (D.O.) in each of plurality of pools employed for sewerage treatment, fish farming, or the like, and comprising the steps of:

sensing the amount of D.O. in each pool individually;

transmitting said sensed amount of D.O. to a centrally located D.O. amount indicator means adjustable to indicate at least two levels of D.O. in said given pool;

setting said indicator means to indicate the D.O. amounts at first and second levels, with the amounts of D.O. at the levels increasing inversely in the order of listing of said levels and with the amount of D.O. in said second level representing the lowest D.O. level of the levels listed;

continuing undisturbed operation of said given pool when said amount of D.O. lies at or above said first level;

energizing an aerating means in said given pool to increase the amount of D.O. in said given pool when the amount of D.O. falls below said first level;

energizing an alarm system when the amount of D.O. in said given pool falls below said second level to warn predetermined personnel that a problem requiring human assistance is present;

de-energizing said alarm system when said amount of D.O. in said given pool rises above said first level;

18. A method as in claim 17 in which the step of energizing said alarm system further comprises the steps of;

providing an automated telephone capable of sequentially dialing a series of telephone numbers of N predetermind personnel and delivering a recorded message stating that a particular pool has developed a problem requiring human assistance and any other information which is deemed desirable and ceasing to dial any further telephone numbers when one of the callees answers his telephone and dials a predetermined code back to the automated telephone.

19. A method as in claim 17 and further comprising the step of:

agitating the water in each pool of a given plurality of pools to increase the amount of dissolved oxygen (D.O.) in said each pool independently.

20. A method as in claim 17 and further comprising the steps of:

positioning water level sensors in a given plurality of pools to measure and generate a signal indicating the water level in said given pools;

displaying said water level in each of said given pools in accordance with said signals;

providing a water pump and a reservoir of water;

extending pipes from said water pump to said reservoir of water and to each of said pools;

controlling the flow of water selectively in any given pipe by a hand operated valve in each of said pipes to maintain a desired and equal level of water in each of said given plurality of pools; and selectively agitating the water in each of said given pools when the amount of D.O. therein drops below predetermined levels.

21. An automated control system for maintaining a given chemical characteristic within a given range in each of a given plurality of pools for treating sewerage, farming fish, or the like, and energizing an alarm system which, when energized, will warn designated persons of the failure to maintain the amount of said chemical characteristic within said given range in a particular pool and with each comprising:

first means at said pool for changing said given chemical characteristics;

a sensor for sensing the amount of said chemical characteristic in each pool;

settable indicator means for detecting, respectively, when said amount of said chemical characteristic drops below a first level and when the amount of said chemical characteristic drops below a second level; with both said first and second levels being selectively determinable by setting said indicator means;

second means for transmitting from said sensor a signal indicating said amount of chemical characteristic to said first and second indicators;

third means responsive to said amount of said chemical characteristic dropping belowl said first level to energize said first means to increase said amount of said chemical characteristic above said first level to a third level;

fourth means responsive to said amount of said chemical characteristic reaching said third level to deactivate said third means;

an alarm system;

fifth means responsive to the amount of said chemical characteristic decreasing below said second level to energize said alarm system and warn said designated persons so that one or more of said designated persons can come to said automated control system and repair the cause of the amount of said chemical characteristic decreasing below said second level.

22. An automated control system as in claim 21 in which said alarm system comprises an automated telephone preprogrammed to respond to energization thereof to dial consecutively up to N predetermined telephone numbers and delivering a message to each dialed telephone defining the location and identity of the pool whose amount of said chemical characteristic has dropped below said second level, until a callee of one of said dialed telephone numbers responds by dialing a predetermined number or series of numbers on his called telephone, at which time said automated telephone will cease dialing any further numbers.

23. A system as in claim 21 and further comprising:

a water reservoir;

water level sensors positioned in a given plurality of pools to measure and generate a signal indicating the water level in each of said given plurality of pools; and a control system responsive to each of said signals from each of said water level sensors of each of said given plurality of pools to determine the relative water levels in each of said given plurality of pools; and a water pump common to all of said given plurality of pools to pump water from one pool to another pool or from said reservoir to one or more selected pools;

water flow direction control valves responsive to the output signals from said control system to route the water pumped by said pump from one pool to another pool or from said reservoir to any selected pool to maintain a substantially equal water level in all of said pools of said given plurality of pools.

* * * * *